Dec. 30, 1952     J. S. KALLER     2,623,751

FERTILIZER SPREADER

Filed Sept. 9, 1948     4 Sheets-Sheet 1

Inventor
J. S. Kaller

Dec. 30, 1952 J. S. KALLER 2,623,751
FERTILIZER SPREADER
Filed Sept. 9, 1948 4 Sheets-Sheet 4

INVENTOR
J. S. Kaller
BY
Glascock Downing Seebe
ATTORNEYS

Patented Dec. 30, 1952

2,623,751

UNITED STATES PATENT OFFICE 2,623,751

FERTILIZER SPREADER

Johan Sigurd Kaller, Lot, Vikingstad, Sweden

Application September 9, 1948, Serial No. 48,481
In Sweden February 17, 1947

6 Claims. (Cl. 275—2)

This invention relates to improvements in fertilizer spreaders, one object being to provide a light fertilizer spreader having a narrow width of track but a great working width.

Other objects will appear upon consideration of the following description, reference being made to the drawings, wherein.

Figure 1:
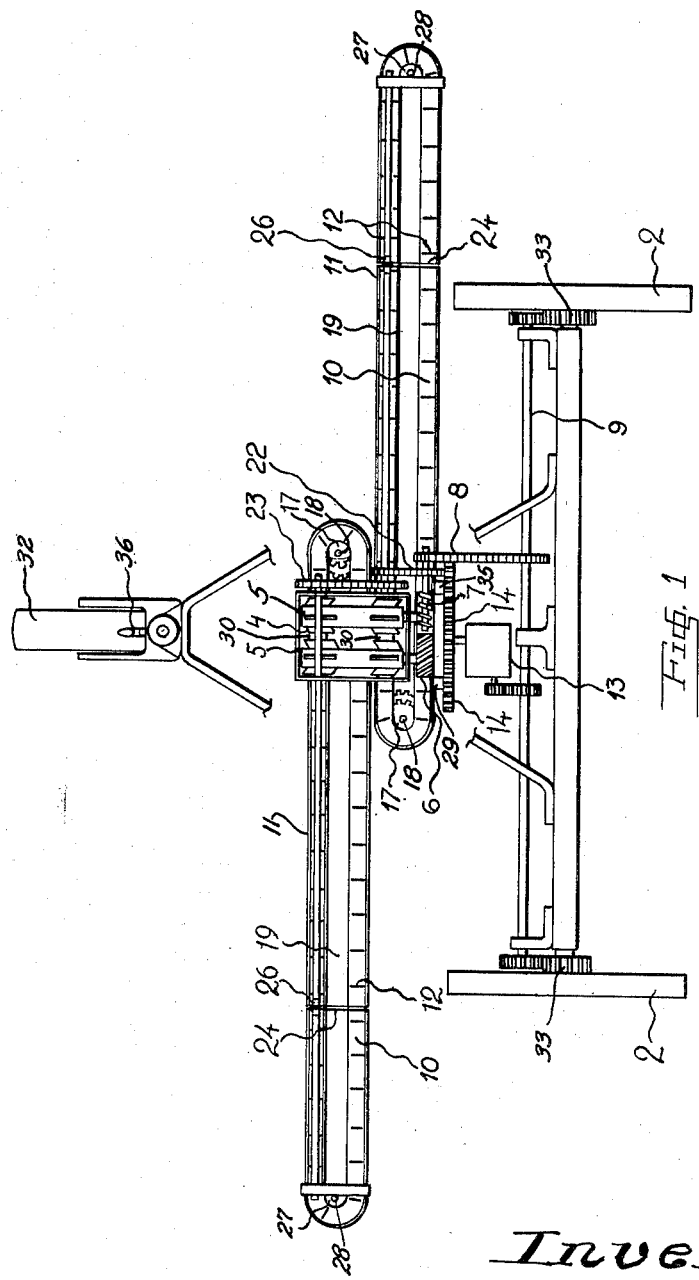
Fig. 1 is a sectional view from above of one design of the fertilizer spreader.
Figure 2:
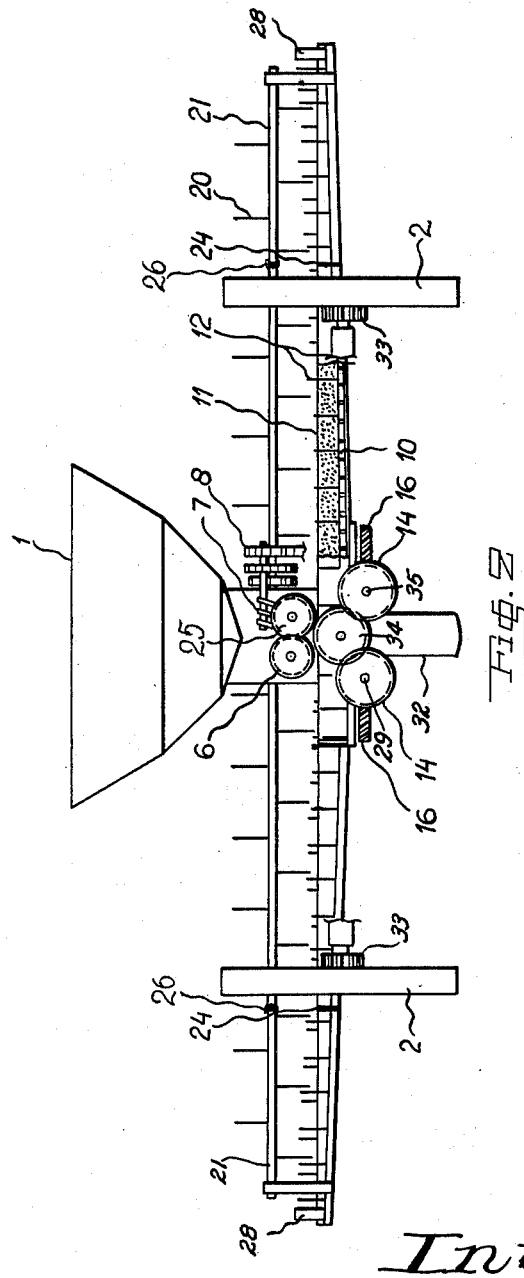
Fig. 2 is a rear view partly in section of the spreader.
Figure 3:
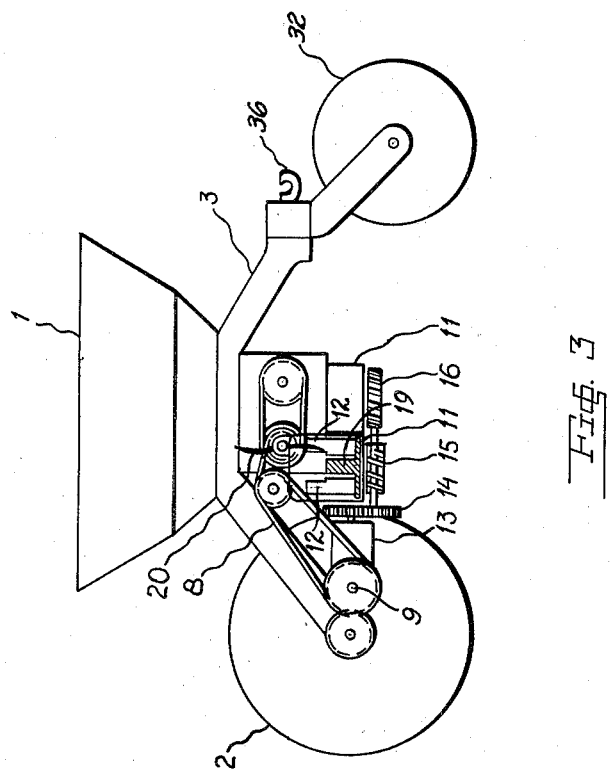
Fig. 3 is a side view of the spreader.
Figure 4:
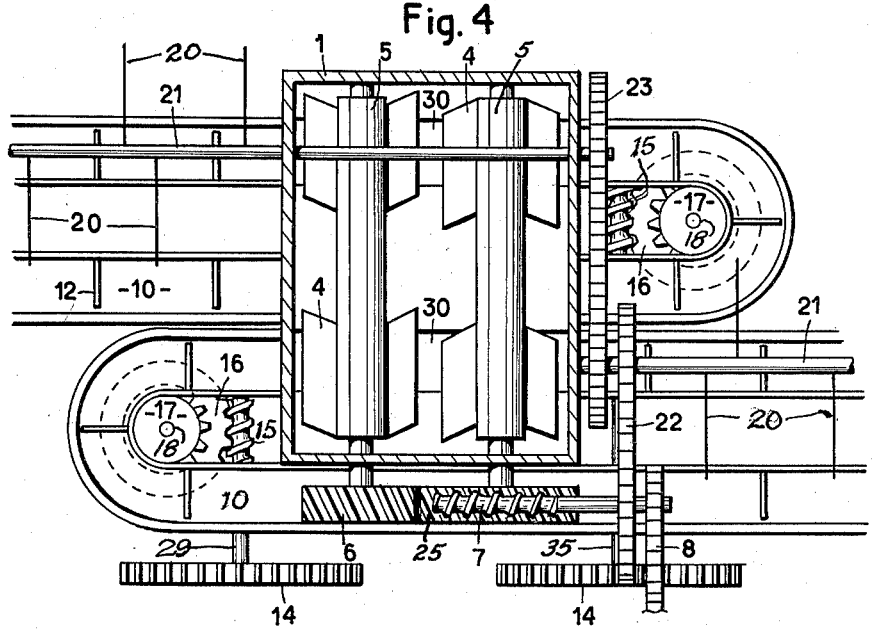
Fig. 4 is an enlarged view of the central part of the spreader.
Figure 5:
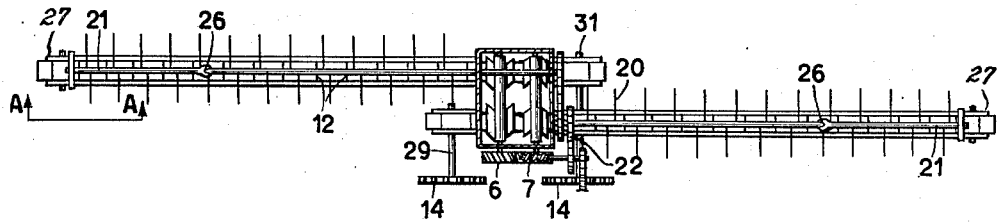
Fig. 5 is a view showing the feed rolls and the chutes in which the endless conveyor belts travel detached from the spreader; and, Fig. 6 is an enlarged detail view of the outer end of one of the chutes and conveyor belts.
Figure 6:
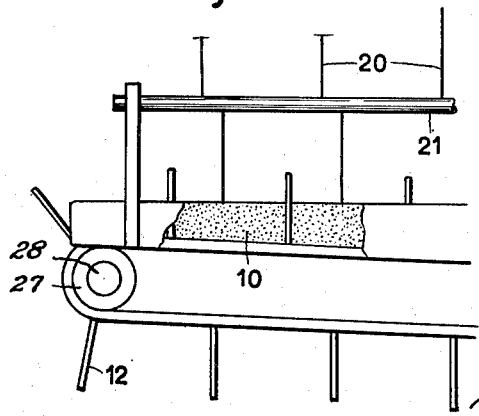

A chassis 3 carried by three wheels 2—2 and 32 has a hopper 1, which is shown in Figs. 2 and 3 but not shown in Fig. 1. The rear wheels 2—2 are located so as to provide a relatively narrow track. By means of a tow hook 36 the spreader can be drawn by a horse or tractor.

Adjacent parallel apertures 30—30 in the lower portion of the hopper there are two rolls 5 fitted in bearings, said rolls extending along the whole length of the hopper and being provided with vanes 4. On the ends of said rolls which extend outside the hopper there are provided gear wheels 6 and 25, said gear wheels meshing with one another. The gear wheel 25 (Fig. 2) is formed as a worm wheel and also meshes with a worm 7, this worm being driven by a shaft 9 through a chain transmission 8 and the shaft 9 being driven from the rear wheels 2—2 through gear wheels 33. The rolls 5, together with the vanes 4, are intended to break up lumps in the fertilizer and to feed the latter to two endless conveyor belts 10, which respectively extend laterally in opposite directions. Each of the conveyor belts runs in its own separate chute 11, the bottoms of which slope downwardly towards their inner ends disposed beneath the hopper 1. In each chute the respective conveying belt runs around pulleys 17 and 27 mounted on vertical shafts 18 and 28, respectively, positioned at the inner and outer ends, respectively, of partitions 19 which divide the chutes into two parallel portions. On the conveying belts there are mounted feeding flaps 12 extending in the transverse direction of the respective chute for the feeding of the fertilizer along the chute. The height over the bottom of the upper borders of the chutes decreases outwardly from the hopper.

The conveyor belts are driven from the shaft 9 through a gear box 13, the gear mechanism therein driving two gear wheels 14—14 on shafts 29 and 35, respectively, through a gear wheel 34. Each of the gear wheels 14—14 has on its shaft a worm 15 which meshes with the drive gear wheel 16 of the respective conveyor belt. Over the front portion of each chute 11 a spreading mechanism comprising a rotating shaft 21 is arranged, each of said shafts having thereon a number of ejector rods 20. The two shafts 21 are driven through the chains 22 and 23, respectively, and the chain transmission 8.

A folding mechanism, comprising a hinge 24 on each of the chutes 11—11 and a universal joint 26 in each shaft 21, facilitates the transport of the spreader on a road.

The fertilizer spreader operates as follows:

As the spreader is towed across a cultivated field the rear wheels 2 drive the rolls 5—5, the conveyor belts 10—10 and the shafts 21—21. The rolls thereby feed fertilizer from the hopper 1 through apertures 30—30 in the bottom of the hopper to the chutes 11—11, said apertures being so located, that the fertilizer will be only fed to the front portion of each chute. Thereby the conveyor belts 10—10 move the fertilizer outwards longitudinally of the chutes, the fertilizer in the chutes then being ejected onto the field by the ejector rods 20 on the shafts 21—21. As the chutes are constructed with a decreasing depth, per unit of length, the same amount of fertilizer will be ejected across the entire width of the spreader.

At least some of the ejector rods 20 may be shaped as wings (Fig. 3), which are obliquely curved in order to spread the fertilizer under the container.

The amount of fertilizer spread in a unit of time by the spreader may be controlled by adjustment of the gear box 13.

When transporting the fertilizer spreader on a road, the rolls 5, the conveyor belts 10, and the shafts 21 should be disconnected from the shafts 9 by means of the gear box 13 and the chutes, together with the conveying belts and the shafts 21, should be folded.

Having described an embodiment of my invention with several variants and modifications, I claim:

1. A fertilizer spreader comprising a chassis mounted on wheels, a hopper for containing fertilizer mounted on said chassis and having an exit aperture therein, a feeding device mounted in said exit aperture, at least one chute extending from said chassis on the side thereof and in registry at its inner end with the aperture in said hopper, said chute being of uniformly decreasing depth towards its outer end, an endless conveyor running through the chute and past the exit aperture in the hopper, longitudinally spaced rigid plates on said conveyor for moving the fertilizer, and a rotary shaft mounted longitudinally of said chute with axially spaced resilient kicker blades thereon normally extending into the spaces between the rigid plates on the conveyor, said kicker blades discharging the fertilizer from the top of the chute but yielding to permit the rigid plates to pass thereunder.

2. A fertilizer spreader comprising a chassis mounted on wheels, a hopper for containing fertilizer mounted on said chassis and having exit apertures therein, feeding devices mounted in said exit apertures, chutes positioned transversely of the chassis extending from the opposite sides of the latter and having their inner ends overlapping and positioned beneath the apertures in the hopper, said chutes being of uniformly decreasing depth towards their outer ends, an endless conveyor running through the chutes and past the exit apertures in the hopper, plates on the conveyor for moving the fertilizer, and rotary shafts mounted longitudinally, respectively, of said chutes with axially spaced kicker blades thereon for discharging the fertilizer carried through said chutes by the respective conveyors.

3. A fertilizer spreader comprising a chassis mounted on wheels, a hopper for containing fertilizer mounted on said chassis and having exit apertures therein, feeding devices mounted in said exit apertures, chutes positioned transversely of the chassis and extending from the opposite sides of the latter and having their inner ends overlapping and positioned beneath the exit apertures, said chutes being of uniformly decreasing depth towards their outer ends and having their bottoms inclined downwardly with respect to the longitudinal axis of the chassis, endless conveyors running through said chutes and past the respective exit apertures in the hopper, plates on said conveyors for moving the fertilizer through the respective chutes, and rotary shafts mounted longitudinally of said chutes with axially spaced kicker blades thereon for discharging the fertilizer carried through said chutes by the conveyors.

4. A fertilizer spreader comprising a chassis mounted on wheels, a hopper for containing fertilizer mounted on said chassis and having exit apertures therein, feeding devices mounted in said exit apertures, open top chutes extending from said chassis on the opposite sides thereof and having their inner ends overlapping and positioned beneath the exit apertures in said hopper, said chutes being of uniformly decreasing depth towards their outer ends, horizontal wheels at the outer ends of said chutes, endless conveyor belts forming the bottoms of said chutes running over the horizontal wheels and extending past the respective exit apertures in the hopper, plates on said conveyor belts for moving the fertilizer through the respective chutes, and rotary shafts mounted longitudinally of said chutes and axially spaced kicker blades thereon for discharging the fertilizer carried through the respective chutes by the conveyor belts.

5. A fertilizer spreader comprising a chassis mounted on parallel wheels, a hopper for containing fertilizer mounted on said chassis and having exit apertures therein, feeding devices mounted in said exit apertures, chutes positioned transversely of the chassis extending from the opposite sides of the latter and having their inner ends overlapping and positioned beneath the exit apertures, said chutes being each formed in two sections connected by a hinge positioned approximately over the respective wheel, endless conveyors running through said chutes and past the respective exit apertures in the hopper, plates on said endless conveyors for moving the fertilizer through the respective chutes, and rotary shafts mounted longitudinally of said chutes with axially spaced kicker blades therein for discharging the fertilizer carried through the said chutes by the conveyors, said rotary shafts having universal joints therein positioned in vertical alignment with the respective hinges in the chutes.

6. A fertilizer spreader comprising a chassis mounted on wheels, a hopper for containing fertilizer mounted in said chassis and having exit apertures therein, a pair of feeding devices mounted in the bottom of said hopper and each having vanes thereon registering with both of said exit apertures in the bottom of said hopper, chutes extending from said chassis and having their inner ends positioned beneath the exit apertures in the bottom of said hopper, endless conveyors running through said chutes and past the respective exit apertures in the hopper, plates on said conveyors for moving the fertilizer through the respective chutes, and rotary shafts mounted longitudinally of said chutes with axially spaced kicker blades thereon for discharging the fertilizer carried through said chutes by the respective conveyors.

JOHAN SIGURD KALLER.

REFERENCES CITED

The following references are of record in the file of this patent:

UNITED STATES PATENTS

| Number | Name | Date |
| --- | --- | --- |
| 27,953 | Barnes | Apr. 24, 1860 |
| 896,178 | Tuttle | Aug. 18, 1908 |
| 1,623,743 | McGuiness | Apr. 5, 1927 |
| 1,668,516 | Litchfield et al. | May 1, 1928 |
| 2,280,234 | Harvey | Apr. 21, 1942 |
| 2,350,476 | Richey | June 6, 1944 |
| 2,369,755 | Rosselot | Feb. 20, 1945 |
| 2,416,898 | Breeze | Mar. 4, 1947 |
| 2,500,681 | Hoffstetter | Mar. 14, 1950 |